July 6, 1926. Re. 16,377

K. VON KANDO

BEARING OF THE ROTORS OF ELECTRIC MACHINES

Original Filed Sept. 17, 1920 2 Sheets-Sheet 1

Inventor:
Kálmán von Kandó
by Emery Booth Janney & Varney
Attys.

July 6, 1926. Re. 16,377

K. VON KANDO

BEARING OF THE ROTORS OF ELECTRIC MACHINES

Original Filed Sept. 17, 1920 2 Sheets-Sheet 2

Inventor:
Kálman von Kandó
by Emery, Booth, Janney & Varney
Attys.

Reissued July 6, 1926. Re. 16,377

UNITED STATES PATENT OFFICE.

KALMAN VON KANDO, OF BUDAPEST, HUNGARY.

BEARING OF THE ROTORS OF ELECTRIC MACHINES.

Original No. 1,490,173, dated April 15, 1924, Serial No. 411,015, filed September 17, 1920, and in Hungary April 24, 1913. Application for reissue filed June 2, 1925. Serial No. 34,485.

My invention relates to improvements in rotor bearings of electric machines of the enclosed type and more especially of such machines having a very small air gap.

In various types of electric machines, especially in the motors of electric locomotives the bearings are submitted to very heavy strains by which the bearings wear out very soon, thus requiring frequent adjusting or changing of the brasses. In machines having very small air gaps, such as induction motors, the adjusting of the brasses has to be done with a very high precision, to insure the necessary evenness of the air gap throughout the whole periphery of the rotor. Such a minute adjusting is however rendered very difficult and often quite impossible with machines of the enclosed type or with motors built into the frame of locomotives.

According to my invention these drawbacks are eliminated, allowing the removal and change or the adjustment of the bushes or brasses of machines of the enclosed type with the utmost precision without the necessity of dismantling, an advantage of great value especially in electric locomotives.

In the annexed drawings I have shown as an example two modifications of my invention:

Figure 1:
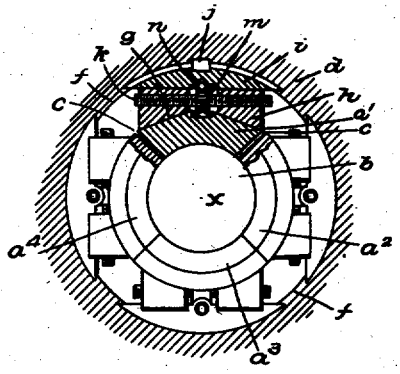
Fig. 1 is a front elevation, partly in section, of a bearing according to my invention.

With reference to Fig. 1, the bushes or brasses are split according to two planes perpendicular to each other, forming thereby four brass segments $a_1$—$a_4$. The brass segments are provided at their joints with projections, forming thereby slots $b$ between two adjacent brass segments extending to the journal $b$. It may be further understood that the slots extending through the brasses to the journal must not be located between the brass segments, but may be formed within these segments, at any accessible point of these latter.

Figure 2:
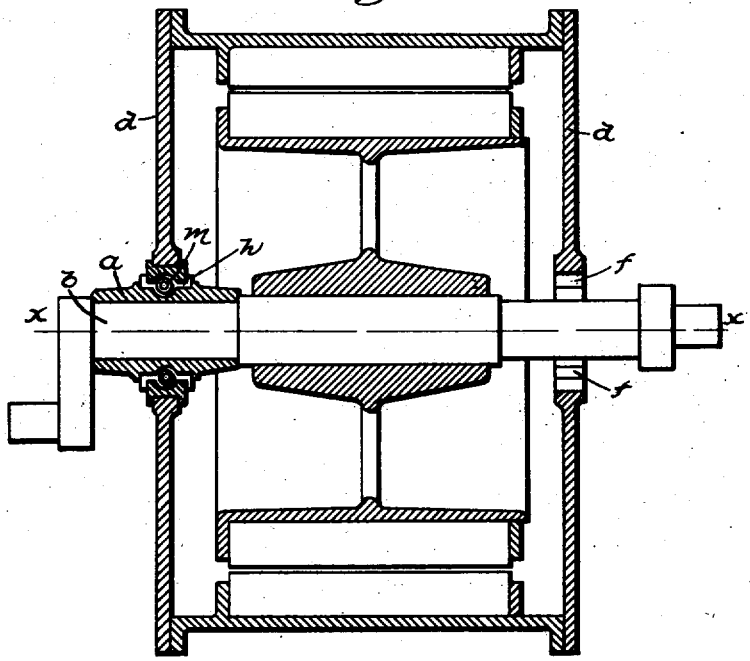
Fig. 2 is a longitudinal sectional elevation; the bearing on the right hand side of the machine being removed.

Opposite to the said slots $c$ I provide on the shell $d$ of the stator (Fig. 2) at least two externally accessible distance surfaces $f$ located in two different radial directions, suitably perpendicular to each other, with respect to, and in the same radial distance from the axis $x$—$x$ of the journal $b$. In Fig. 1, I have shown four distance-surfaces $f$ in respective angular distances of 90°, each slot $c$ having an opposite distance surface $f$.

The bushes or brass segments are provided with any suitable adjusting device.

According to Fig. 1, $i$ are shoes located opposite to each brass segment respectively and $j$ are keys to secure said shoes in place. $g$ are sloping bearing surfaces on the outer face of the brass segments and $h$ are two opposed wedges inserted between the shoe $i$ and the bearing surfaces $g$. $k$ are right and left-handed twin-screw bolts coupling the two wedges $h$, $h$ acting on one brass segment. $m$ is a worm wheel located between the two wedges coupled by said twin-screw bolt $k$ and secured thereto. $n$ is a worm parallel with the journal $b$ and meshing with the worm wheel $m$, said worm being prevented from moving in its axial direction.

All four brass segments are provided with like adjusting devices.

To adjust the brasses, the worms $n$ belonging to the respective brass segments are rotated by means of suitable wrenches. The worm $n$ rotates the worm wheel $m$ together with the twin-screw $k$, thereby drawing together or separating from each other the two coupled wedges $h$ according to the direction of rotation of the worm. If the wedges $h$ are drawn together, the respective brass segment will be pressed, by means of the beveled faces $g$, $g$ against the journal and, if the wedges $h$, $h$ are removed from each other, the brass segment is permitted to withdraw from the journal.

The distance of the periphery of the journal from the distance surfaces $f$, $f$ can be measured through the slots $c$ in four different directions, spaced 90° apart. The brasses are properly adjusted as long as the distances measured in the four slots $c$ remain equal. In this way an even breadth of the air-gap may be insured throughout the whole periphery of the rotor, without dismantling of the machine.

If by rotating the worms $n$ the wedges $h$, $h$ are removed far enough from each other, the brass segments may be removed and changed without dismantling of the machine.

The worm and worm gear for adjusting the brass segments act as locking devices to keep the brasses in their respective positions.

Figure 3:
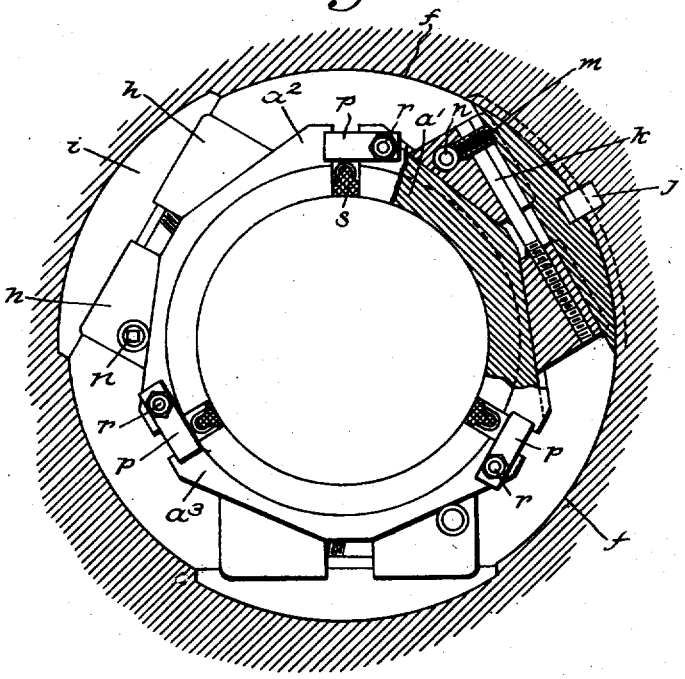
Fig. 3 is another modification of the bearing in front elevation, partly in section.

According to the modification shown in Fig. 3, I provide instead of the twin screws for controlling the wedges adjusting the brass segments, single screw bolts *k* engaging with their threaded part one of the two wedges, while the worm *n* is journalled in the other wedge. The worm wheel *m* meshing with said worm is secured to and near the end of the screw bolt *k*.

Figure 4:
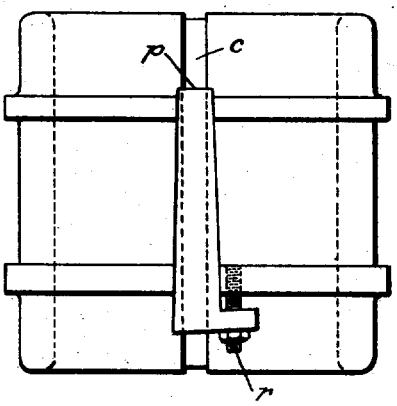
Fig. 4 is a detail side elevation of the group of bearing segments shown in Fig. 3.

According to Fig. 3 the bush of the bearing is split into three segments instead of four, as shown in Fig. 1 and the slots are spaced 120° apart. A further improvement shown in Figs. 3 and 4 are the wedges *p* inserted between the adjacent faces of the brass segments. *r* is a screw for securing the wedges *p* to the brass segments and which cooperate with said wedges to allow pivotal respective adjustment of said bushes. Said wedges are for securing the brass segments in their relative concentric positions even though the bearing is worn out to such a degree that the journal would not hold the brasses in their proper positions.

I have shown further strips *s* of elastic and oil proof material, such as felt, filling the space between the adjacent brass segments and preventing the lubricant from flowing.

It should be understood that I do not limit my invention to the construction shown as an example in the drawing for obviously the distance surfaces *f* may be of a greater or smaller breadth, and may be reduced to mere ribs or edges. They may be formed integral with the front plates of the stator shell, or may be inserted as separate hardened pieces. It may be further understood that the slots extending through the brasses to the journal need not be located between the brass segments, but may be formed within these segments at any accessible point thereof.

Although it is preferable to dispose the distance faces at equal distances from the journal, they may be located at different distances. This difference must, however, be taken into consideration when adjustments are made.

Claims:

1. In an electric machine, a rotor, a stator, a shell, bearings in said shell supporting the journals of the rotor, segments forming the bushes or brasses in said bearings, means to radially adjust each of said segments, externally accessible slots extending radially through said bushes or brasses to the journals and relatively fixed externally accessible distance surfaces in connection with the stator shell opposite to the said slots.

2. In an electric machine, a rotor, a stator, a shell, bearings in said shell supporting the journals of the rotor, segments forming the bushes or brasses in said bearings, beveled bearing surfaces on the outer face of the brass segments, pairs of wedges inserted between the said bearing surfaces of the brass segment and the stator shell, a screw bolt engaging said wedges, a worm wheel on said screw bolt between said wedges, and a worm engaging said worm wheel, externally accessible slots extending radially through said bushes or brasses to the journals and externally accessible distance surfaces in connection with the stator shell opposite to the said slots.

3. In an electric machine, a rotor, a stator, a shell, bearings in said shell supporting the journals of the rotor, segments forming the bushes or brasses in said bearings, beveled bearing surfaces on the outer face of the brass segments, pairs of wedges inserted between the said bearing surfaces of the brass segments and the stator shell, a screw bolt engaging one of the said wedges, a worm wheel on said screw bolt between said wedges and a worm journalled in the other wedge and engaging said worm wheel, externally accessible slots extending radially through said bushes or brasses to the journals and externally accessible distance surfaces in connection with the stator shell opposite to the said slots.

4. In an electric machine, a rotor, a stator, a shell, bearings in said shell supporting the journals of the rotor, segments forming the bushes in said bearings, beveled bearing surfaces on the outer face of the said segments, shoes secured to the stator shell, pairs of wedges inserted between the said bearing surfaces of the said segments and the said shoes and means to alter the relative distance of said wedges, externally accessible slots extending radially through said bushes to the journals and externally accessible distance surfaces in connection with the stator shell opposite to the said slots.

5. In an electric machine, a rotor, a stator, a shell, bearings in said shell supporting the journals of the rotor, segments forming the bushes in said bearings, beveled bearing surfaces on the outer face of the segments, shoes secured to the stator shell, pairs of wedges inserted between the said bearing surfaces of each segment and the said shoes, a screw bolt engaging said wedges, a worm wheel on said screw bolt between said wedges and a worm engaging said worm wheel and operable from the end of said bearing.

6. In an electric machine, a rotor, a stator, a shell, bearings in said shell supporting the journals of the rotor, segments forming the bushes in said bearings, beveled bearing surfaces on the outer face of the segments, shoes secured to the stator shell, pairs of opposed wedges inserted between the said bearing surfaces of each segment and the said shoes, a screw bolt engaging both of the wedges of each pair, a worm wheel on said screw bolt between said wedges and a worm journalled in the other wedge and engaging said worm wheel, externally accessible slots extending radially through said bushes to the journals and externally accessible distance surfaces in connection with the stator shell opposite to the said slots.

7. In an electric machine, a rotor, a stator, a shell, bearings in said shell supporting the journals of the rotor, segments forming the bushes in said bearings, externally accessible means to radially adjust said segments, means to keep apart the said segments at their joint to form slots extending radially through said bushes to the journals and strips of felt filling said slots.

8. In an electric machine, a rotor, a stator, a shell, bearings in said shell supporting the journals of the rotor, segments forming the bushes in said bearings, externally accessible means to radially adjust said segments, opposed wedges adjustable transversely to the axis of said journal and inserted between the joint faces of the said segments keeping them apart to form slots extending radially through said bushes to the journals and externally accessible distance surfaces in connection with the stator shell opposite to the said slots.

9. In an electric machine, a rotor, a stator, a shell, bearings in said shell supporting the journals of the rotor, segments forming the bushes in said bearings, externally accessible means to radially adjust said segments, opposed wedges inserted between the joint faces of the said segments keeping them apart to form slots extending radially through said bushes to the journals, strips of an elastic and oil-proof material filling said slots and externally accessible distance surfaces in connection with the stator shell opposite to the said slots.

10. In a bearing, a series of segments constituting a bush for said bearing, a pair of opposed adjustable wedges engaging each of said segments to effect independent lateral adjustment of said segments, a right and left threaded screw bolt for each pair of wedges and worm and worm gear means arranged between the wedges of each pair independently to move said wedges toward and from each other.

11. In a bearing, a series of segments constituting a bush for said bearing, a wedge interposed between adjacent edges for adjoining segments and adjustable longitudinally of the bearing for circumferentially spacing said segments and means for effecting radial adjustment of said segments.

12. In a bearing, a series of three segments constituting a bush for said bearing, and means interposed between adjacent edges of adjoining segments and adjustably secured to at least one of the adjoining segments for effecting the circumferential spacing of said segments.

13. In a bearing, a series of three segments constituting a bush for said bearing, and means interposed between adjacent edges of adjoining segments and pivotally secured to at least one of the adjoining segments for effecting the circumferential spacing of said segments.

14. In a bearing, a series of three segments constituting a bush for said bearing and wedges pivotally secured to at least one of said segments and arranged with its opposed wedging surfaces respectively in engagement with adjacent edges of adjoining segments.

15. In a bearing, a series of three segments constituting a bush for said bearing, wedges pivotally secured to at least one of said segments and arranged with its opposed wedging surfaces respectively in engagement with adjacent edges of adjoining segments, and means for effecting radial adjustment of said segments.

16. In a bearing, a series of three segments constituting a bush for said bearing and means adjustably interposed between adjacent edges of adjoining segments and pivotally connected with at least one of said segments and forming with said segments a yielding triangulum.

17. In a bearing, a series of three segments constituting a bush for said bearing, independently adjustable means interposed between adjacent edges of adjoining segments for maintaining said segments in predetermined spaced circumferential relation and means for effecting radial adjustment of said segments.

In testimony whereof, I have signed my name to this specification.

KALMAN VON KANDO.